United States Patent [19]

Giuliani

[11] 3,755,651

[45] Aug. 28, 1973

[54] APPARATUS FOR AND METHOD OF MAKING CONDUCTIVE RECORD CARDS

[76] Inventor: Robert L. Giuliani, 45310 Akimala Pl., Kaneohe, Hawaii 96744

[22] Filed: Sept. 27, 1971

[21] Appl. No.: 183,940

Related U.S. Application Data

[63] Continuation-in-part of Ser. No. 118,329, Feb. 24, 1971.

[52] U.S. Cl. .......... 235/61.1, 235/61.12 C, 234/128, 235/61.11 C

[51] Int. Cl. .......... G06k 7/06, G06k 1/00

[58] Field of Search .......... 235/61.12 N, 61.12 C, 235/61.6 C, 61.1, 61.11 C; 234/36, 128; 101/29

[56] References Cited

UNITED STATES PATENTS

| | | | |
|---|---|---|---|
| 1,831,359 | 11/1931 | Lasker, Jr. | 235/61.6 C |
| 1,567,325 | 12/1925 | Lasker, Jr. | 235/61.12 C |
| 2,866,506 | 12/1958 | Hierath et al. | 234/128 |
| 2,819,020 | 1/1958 | Baer et al. | 235/61.11 C |
| 1,473,618 | 11/1923 | Gault | 235/61.1 |
| 1,962,732 | 6/1934 | Bryce et al. | 235/61.1 |

*Primary Examiner*—Thomas A. Robinson
*Attorney*—James C. Wray

[57] ABSTRACT

Errors are avoided by marking credit cards with machine-readable spot arrays in a computer controlled machine. A card is placed in a tray on a movable block. The block is stepped row by row according to the number of rows on the credit card. Solenoids controlled by a computer selectively strike a tape to a card, transferring a machine readable material to the card. The number of punches corresponds to the number of available spaces in each row. The unique spot arrays are exact duplicates of binary record identifiers in the controlling computer. When the cards are subsequently read, the array directs the computer logic to the correct record among voluminous records, and the computer accesses the information therein.

8 Claims, 7 Drawing Figures

INVENTOR
ROBERT L. GIULIANI

BY

Earl E Moore
ATTORNEY

INVENTOR

ROBERT L. GIULIANI

BY

Earl E. Moore

ATTORNEY

APPARATUS FOR AND METHOD OF MAKING CONDUCTIVE RECORD CARDS

The present case is a continuation-in-part of application Ser. No. 118,329, filed Feb. 24, 1971.

This invention relates to a method and apparatus to affix electrical conductor spots on cards wherein the arrangement of the spots on each card is different in order to identify a particular person, a group of persons, or an organization. No two cards have their spots arranged in the same manner or design. The cards are manufactured in a machine, and the cards are used in the system described in the above-entitled application.

An object of the invention is to present a card manufacturing device to make cards provided with spaced apart electrical conducting spots thereon and which includes a control means which may be a computer machine.

Another object of the invention is to economically manufacture a card having conductor spots placed on its face, wherein the position and arrangement of the spots indicates ownership by a specific person or organization and which card, or cards, are important to the operation of a device which was disclosed in the said prior application.

These and other objects and features of the invention are apparent in the disclosure, which includes the foregoing and ongoing specification, the claims and the drawings in this application and in the said prior application identified above.

Figures 1, 2, 3, 4, 5, 6:
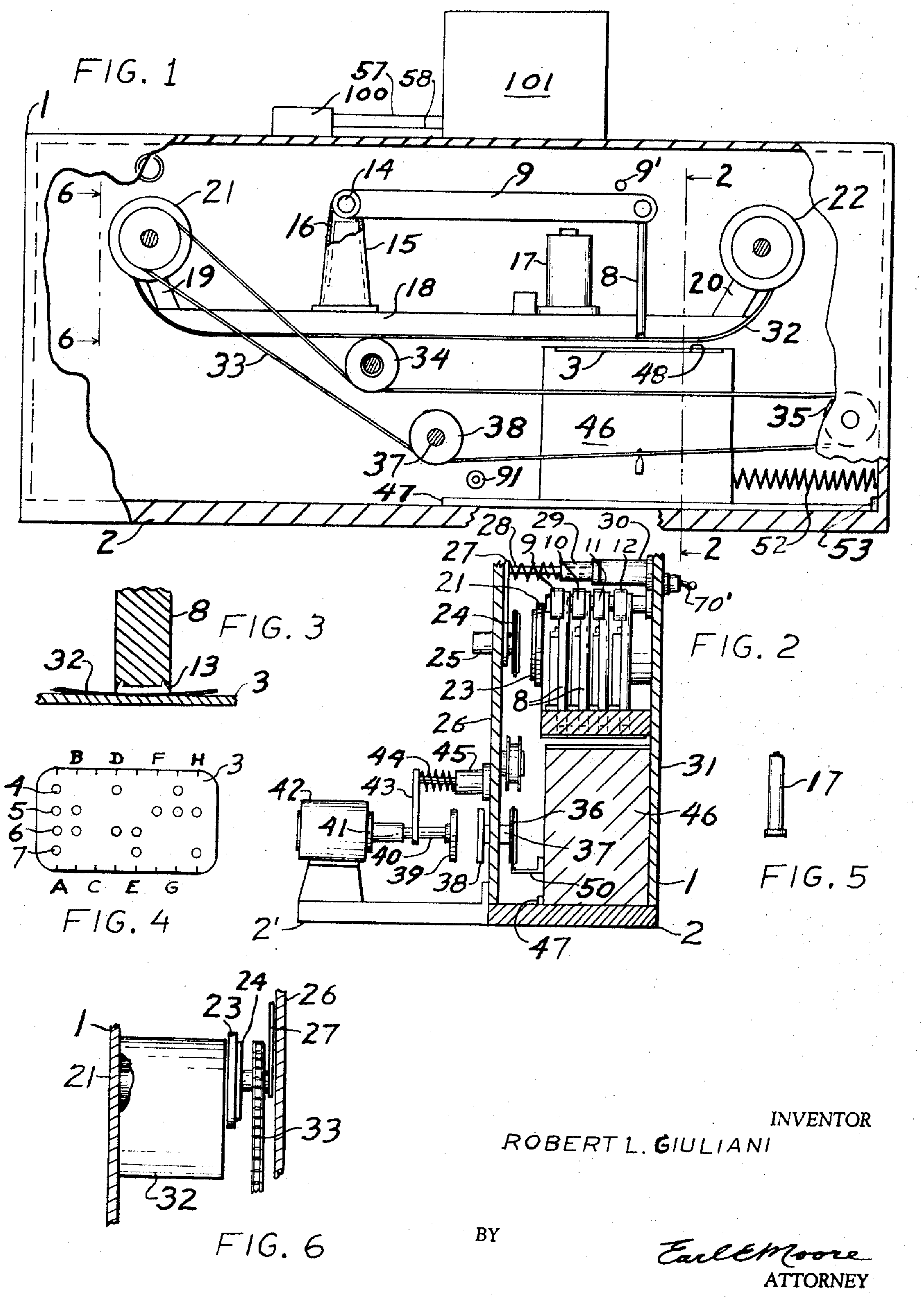
FIG. 1 is an elevational view of the invention with portions broken away to show details of internal working parts.
FIG. 2 is an elevational view of parts and sectional view of other parts taken substantially along the line 2—2 of FIG. 1.
FIG. 3 is an enlarged vertical sectional view of the lower portion of a stamper or cutter means with associated parts employed therewith.
FIG. 4 is a plan view of a portable card or plate.
FIG. 5 is a side elevational view of a solenoid as employed in a relay device.
FIG. 6 is a view taken along the line 6—6 of FIG. 1.

As illustrated in the drawings, the numeral 1 indicates a casing or cover means which is mounted upon a base 2. The base has an extension shown at 2'. This casing may have parts removable for ingress and egress of a portable card 3 and for access to internal parts for adjustment and repairs. The card is a non-conductor of electricity in this case. The card, however may be made of conducting metal, in which case the spots are non-conductors.

The card 3 as shown in FIG. 4, is provided with a plurality of electrical conducting spots or patches, as indicated at numerals 4, 5, 6 and 7 in the first vertical row "A" from the left side of the card. The vertical rows that follow toward the right have been lettered "B" to "H." Vertical row "C" has no conducting spots in this particular case. The spots are placed fully in accordance to an identification plan fully explained in the said prior companion application.

As shown in FIG. 2 of the drawings, four punch-bar levers are numbered 9, 10, 11 and 12. The upper end portion of a punch-rod 8 is attached to each punch-bar lever. The bottom end of each punch-rod is sufficiently sharp to cut a hole of any suitable shape. Only four punch-rods with their respective punch-levers are shown, since in this case only four horizontal rows are provided for the card 3. Should there be eight horizontal rows, then eight levers and cutting rods would be provided.

Each punch-lever is pivoted upon a common axle 14. This axle is supported by the hollow elongated standard means 15. In standard 15, a ribbon spring means 16 attaches to levers 9, 10, 11 and 12, and this spring as shown, is placed under stress when a lever is forced downwardly at its distal end. Ribbon spring means 16 enables the lever to return to its normal position as shown in FIG. 1. A cross stop-bar 9' aligns all levers. Under each lever flattened solenoid 17 is secured to the shelf or plate 18. The end portion of this shelf is curved for ease in moving a tape or ribbon.

Standards 19 and 20 are fixed at opposite ends of the shelf. Each standard has an axle means to accommodate a tape or ribbon. These axle means hold rollers 21 and 22. Upon the face of roller 21 is a sanded clutching surface 23, which is engageable by a similar sanded clutching surface upon the side of a sprocket wheel 24. The term sanded indicates a rough surface, e.g. emery which acts as a means to hold secured temporarily the two surfaces for the purpose of transmitting power.

Sprocketed wheel 24 is attached to axle 25 that is shiftable through an opening in the side wall 26 of the casing. The lower end of bar 27 fixes to axle 25. Its top end attaches to and is splined to rod 28 that is slidable in a guide tube means 29. This tube is fixed to the front end of a solenoid 30 which in turn is fixed to the side wall 31 of the casing. When this solenoid is energized, the lever 27 will force the sanded side of the sprocket wheel 24 into engagement with the sanded surface 23. Thus roller 21 is rotated to pull a special tape or ribbon 32 from the loaded roller 22. When solenoid 30 is dead, a coiled spring returns lever 27 to normal position.

Tape or ribbon 32, is impregnated with an electrical conducting substance which may be minute grains of a good conducting metal such as copper. The underside of this strip is provided with gum or other suitable adhesive so that when the cutting rod or rods 8 are thrust downwardly their cutting ends 13 will punch out a round spot of material and attach the spot to the top face of the card 3.

An endless chain at 33 freely rides along the spaced apart guide rollers 34 and 35. Sprocket wheel 36 moves chain 33. Sprocket wheel 36 is keyed to shaft 37, which has its bearing in the wall 26. A clutch wheel 38 is keyed to the other end of the shaft and has a sanded face adapted to be connected with a clutch wheel 39 which also has a sanded face. Clutch wheel 39 is keyed to a motor shaft 40. Shaft 40 is axially slidable and is splined for rotation with guide type shaft 41 which extends from the electric motor 42. The lower end of a bar 43 fits in a groove on the shaft 40 to shift the shaft 40 when a rod 44 is drawn into the solenoid 45. A coiled spring is provided on this rod 44 to return the bar 43 to normal position when the solenoid is dead.

A slidable block or tray device of suitable material is indicated at 46 and slips along a path between the wall 31 and the rib 47, which is fixed to the base. The top of this block has a recessed portion 48 adapted to receive the card 3. This card is of a suitable material and may be made of plastic material so that the surface is not easily cut by cutters or stampers 13 but at the same time makes a sufficiently hard backing so that the ribbon 32, if used, can neatly be punched-out wherever desired. The underside of the ribbon may be coated with an electrical conducting ink which is stamped onto the card. In this case the cutter is not used. An invisible type of magnetic ink may be employed for the electrical conducting imprint. However, the bottom ends of the rods 8 may employ cutters 13 rather than ribbon 32. In this case, only holes are punched-out in the card where non-conductors are desired.

At a low center of gravity, the block is provided with a bracket means 50, which has one portion fixed to the block. The distal end portion of bracket means 50 is shaped to enter the loop of one of the links of the chain 33 from underneath in order to assure positive connection at all times. Thus, the block and its card 3 can move along the guideway as the lower portion of chain 33 moves to the left. When the block 46 is at its limit of movement to the left, as viewed in FIG. 1, an electric eye 91 releases all electric power, and a coiled spring means 52 returns the block to its starting position where it strikes the stop element 53. Stop element 53 is adjustably fixed to the base 2.

Figure 7:
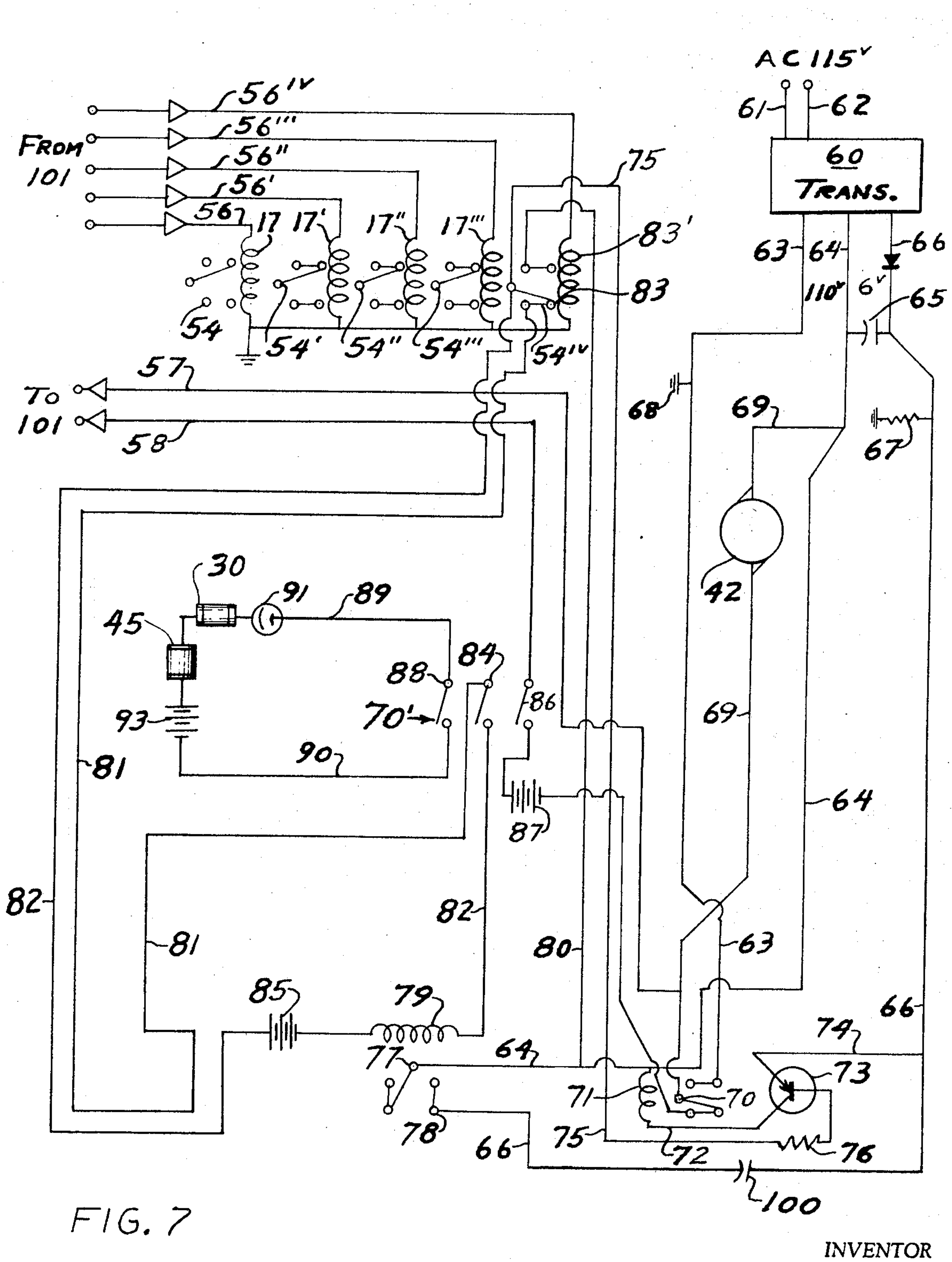
FIG. 7 is a wiring diagram of a circuit to control stamping means.

As illustrated in FIG. 7 of the drawings, electrical conductors 57 and 58 lead to a computer 101. Conductors 56, 56′, 56″, 56‴ and 56$^{iv}$ lead from the computer 101 to their respective relay coils having the same prime markings. The main electrical feed for the main working units comes from a transformer 60 which is fed by the 115 volt public service lines 61 and 62. From this transformer the conductors 63, 64 and 66 extend. 110 volts is provided between 63 and 64 and 6 volts between 66 and 64. A filter capacitor 65 is provided and a bleeder resistor 67 is installed between line 66 and the ground. Line 63 is grounded at 68. Branch conductor 69 has an electric motor 42 in series therewith.

A relay switch 70 has its live blade connected to the conductor 69 and one of its contacts is connected to conductor 63. Coil 71 of the relay connects with conductor 72 which leads to a transistor 73. Coil 71 is connected to the conductor 64 as shown. The transistor connects with conductor 66 through line 74 and with the line 75 through a resistance 76. The conductor 64 terminates at the relay switch blade 77 and the conductor 66 terminates at the switch contact member 78. This relay has the solenoid coil 79. The conductor 64 connects with the line 80.

One end of conductor 81 is connected to the contact 83 of the relay switch 54$^{iv}$ and its other end is connected to the blade 84 of a switch. The contact of this switch is connected to one end of the line 82. This line 82 has the series arranged units 79 and the 6 volt battery 85. Switch 86 is arranged in series relationship with a 6 volt battery 87. Switch 88 makes and breaks lines 89 and 90. These switches 84, 86 and 88 are known as wafer switches or three-gang switches. Line 89 leads to one side of an electric eye 91 which is in series with the solenoids 30 and 45 and a 6 volt battery 93, as shown.

Relay switch 54$^{iv}$ closes in an opposite direction during the stamping or spotting operation and thus causes the next charge to be placed on capacitor 100.

Ribbon 32 in FIG. 3 may be similar to a typewriter ribbon with electrical conducting ink on the underside. Instead of cutting the ribbon the electrical conducting ink is stamped on the card, such as when the die end 13 is a blank end. The ink may be The ribbon may also have a reflective surface in which case the pegs 80 of said prior application could be light and cells.

After card 3 is placed on tray 48 of FIG. 1 the manual switch 84, 86, 88 is closed, which causes the following actions:

First: Energizes solenoids 30 and 45 to cause 24 and 39 to be shifted and operate chain 33. (FIG. 6) Chain 33 continues to work until the block 46 breaks the light beam of electric eye 91.

Second: Energizes solenoid 79 and this supplies power to the timing circuit involving units and conductors 70 to 76 inclusive and also the timing capacitor 100.

Third: Energizes the circuit or conductors 57 and 58 and signals the computer 82 to make ready for card spotting.

The computer will now signal the appropriate relays through their solenoids 17, 17′, 17″ or 17‴. The switch 54$^{iv}$ will do the following:

First: Discharge timing circuit through transistor 73 and close relay 70, thus allowing motor 42 to advance card to next position or row by capacitance indicated at 100.

second: During this operation relay switch 54$^{iv}$ is engaged and previous spot marking sequence is assumed to be completed.

Third: Input power for motor 42 may be obtained from any source. In this case power is taken from power supply lines 63–69.

Fourth: It must further be noted that switching relay 54$^{iv}$ will take the switching position opposite of the relay marking function; that is, when the marking or spotting sequence is complete at 54, 54′ 54″ and 54‴ the switch 54$^{'v'}$ will discharge the timing circuit and thus advance the card to the next position.

Fifth:: While the marking sequence is under way the switch 54$^{iv}$ will close in the opposite direction and will tie in to the timing circuit charging sequence in circuit 81–82 and place the next charge on capacitor 100 by again placing solenoids 17, 17′ and 17″ and 17‴ power supply in series with the timing circuit.

OPERATION

The operation begins when the portable switching card 3 is placed in the sliding card block or tray 46 and the manual main switch 70′ is closed, which switch is a three-gang switch consisting of the switches 84, 86 and 88. When closed, the timing capacitor 100 begins to charge and the solenoids 30 and 45 are activated, which draws the bars 27 and 43 on sliding shafts 28 and 44, thus overcoming the resistance of their respective coil springs. This action causes the drive means 39 to shift and engage the wheel 38. This action simultaneously causes the drive means 24 to shift toward and engage the wheel 23. The electric motor 42 is operated only for a preset time interval, which depends upon a timing circuit controlled by the timing capacitor 100. The electric motor operates and turns the sprocket wheel 36 which moves the chain 33 a short distance.

This chain is connected to the sliding tray or block means 46 by a hook means 50, which causes the block to move forward a distance equal to the distance between the vertical rows on the switching card 3. The chain also causes the ribbon 32 to move forward by the turning of the drive means 24 at the moment it engages with wheel 23. At this time the timing capacitor 100 is drained, and a signal is activated over the lines 57–58 to the computer 101.

The computer reacts by discharging a number of electrical bits over the lines 56, 56′, 56″ and 56‴. These bits form a pattern which determine which of the relays or coils 17, 17′, 17″ and 17‴ are operated. A bit signal is also sent over line $56^{iv}$ to coil 83′ which will cause the switching relay $54^{iv}$ to shift to the opposite direction. A solenoid 17, for instance, is closed and causes the associated marking punch 8 to drop with enough force to cut the ribbon 32 which is made of an electrical conducting substance and which has a strong adhesive on the bottom thereof.

The ribbon 32 will then be cut in the shape of the die on the punch 13 and this portion will adhere to the card 3 in the precise position required by the aforementioned application. When the punch 8 has been retracted the plate 18 will separate the ribbon from the punch. At this time, the relay switch $54^{iv}$ will signal the timing capacitor 100 to discharge so that the operation can be repeated for the next vertical row, which would be "B" in this case.

Upon completion of the punching operations, the block 46 will proceed to the point where it will cut the electric eye beam at 91. This action causes the circuit to release the solenoids, thus permitting the springs of solenoids 30 and 45 to separate the drive gears 24 and 39 from gear wheels 21 and 38, respectively. The spring 52 which is attached to the sliding block 46 then returns the block to its original position, the coded switching card 3 is removed and given to the customer or placed in the card machine at a cash register for instance as set forth in the said prior application.

The card constructed by the present device is intended for use in the automated card controlled electronic system described in copending patent application Ser. No. 118,329 filed Feb. 24, 1971.

Many novel features and details of this invention are disclosed herein. However, it is to be understood that the invention is not necessarily limited to the exact terms, form and details disclosed since it is apparent that various changes may be made without departing from the spirit and scope of the invention as described and claimed.

Having thus described and illustrated my invention, what is claimed and believed new and which is desired to be secured by Letters Patent is:

1. In a device for providing cards and the like with message codes: a card-receiving unidirectionally shiftable block means, shifting means for shifting the shiftable block means in short steps along a definite path, a card holder on the shiftable block means, and a plurality of stamping means positioned in a row above the block means and operated to create spots on a card in the said holder, a like plurality of solenoids arranged above the block means for selectively and simultaneously operating the stamping means, preselecting means connected to the solenoid means for preselecting which solenoids operate simultaneously, and interlock means connected to the shifting means and to the solenoids for operating the solenoids upon completion of each step movement produced by the shifting means.

2. The device recited in claim 1 wherein the solenoids are operated so that spots are spaced here and there on the card in spaced apart rows in accordance to electrical signal bits from a device wherein information is electrically stored and from which information can be electrically emitted.

3. The device recited in claim 1 wherein between stamping and block means a ribbon-like means is provided which has adhesive thereon so that conductive or reflective spots are secured in their proper place on the card.

4. The device recited in claim 1 wherein the shifting means has a motor means provided for shifting the card holder, a capacitor for controling operation of the motor means, charge and discharge of the capacitor causing the motor to operate at intervals to move the card holder from one row area to another row area on the card.

5. The device recited in claim 1 wherein the conductor spots are placed on the card in accordance to electrical signal bits from a control center, the ribbon means having an adhesive material on the side thereof toward the card in order to secure the spots in position, and each cutter means has its lower end recessed in normal idle position so that the ribbon means can be completely freed from the cutter means after each operation, an endless chain means having a plurality of links and which chain means is shifted by an electrical motor in short steps, and a catch means extending from the block means and which catch means is coupled to one of the links so that movement of the chain means shifts the block means.

6. The device recited in claim 1 wherein a certain code is provided on the card and which code is a duplicate of a code retained in a computer means for identification purposes.

7. The device recited in claim 1 wherein there are means providing unique positioning of conductor and non-conductor spots on cards causing a great plurality of unique cards whose maximum is $2^n-1$ where "$n$" is the sum of all intersections of rows and columns on the card.

8. The method of making machine-readable personal identification cards comprising preselecting a unique pattern of spots in an array having a predetermined number of positions in a predetermined number of rows, placing a blank card in a tray of a unidirectionally shiftable block, preselecting solenoids for operating separate punches in a first row according to the preselected pattern for that row, shifting the block one row, sensing completion of shifting, and operating the preselected solenoids and punches simultaneously upon completion of the shifting of the block, lifting the punches, preselecting solenoids according to the next row, shifting the block to the next row, sensing completion of shifting and immediately simultaneously operating the preselected solenoids and associated punches and repeating the steps until the solenoids have been operated on the last row on the card, storing the preselected unique pattern, removing the card, shifting the block back to start, preselecting a second unique pattern, inserting a second card in the block tray and repeating the steps.

* * * * *